3,757,014
Patented Sept. 4, 1973

3,757,014
7-[D-(α-AMINO-α-PHENYL-ACETAMIDO)] - 3-[S-(5-HYDROXYMETHYL - 1,3,4 - OXADIAZOL-2-YL)THIOMETHYL]-3-CEPHEM-4-CARBOXYLIC ACID AND SALTS
Leonard Bruce Crast, Jr., Clay, N.Y., assignor to Bristol-Myers Company, New York, N.Y.
No Drawing. Filed May 7, 1971, Ser. No. 141,417
Int. Cl. C07d 99/24
U.S. Cl. 260—243 C                                   7 Claims

ABSTRACT OF THE DISCLOSURE

7-[D-(α-amino - α - phenylacetamido)] - 3 - [S-(5-hydroxymethyl - 1,3,4 - oxadiazol - 2 - yl)thiomethyl]-3-cephem-4-carboxylic acid and its nontoxic, pharmaceutically acceptable salts are valuable as antibacterial agents, as nutritional supplements in animal feeds and as therapeutic agents in poultry and animals, including man, and are especially useful in the treatment, including by oral administration, of infectious diseases caused by many Gram-positive and Gram-negative bacteria.

BACKGROUND OF THE INVENTION

(1) Field of the invention

The cephalosporins of the present invention possess the usual attributes of such compounds and are particularly useful in the treatment of bacterial infections.

(2) Description of the prior art

Cephalothin and cephaloridine are well-known antibacterial agents; see U.S. Pats. 3,218,318; 3,449,338; and 3,498,979. The patent literature also contains considerable data on cephaloglycin and cephalexin; see U.S. Pats. 3,303,193; 3,422,103; 3,364,212 and 3,507,861 and Great Britain 985,747; 1,054,806 and 1,174,335 and Belgium 696,026 (Farmdoc 29, 494) and South Africa 67/1260 (Farmdock 28,654). Newer cephalosporins include cefazolin and cephapirin; see U.S. Pat. 3,516,997 [and also Netherlands 68/05179 (Farmdoc 34,328) and South Africa 68/4513] and U.S. Pat. 3,422,100.

The literature on cephalosporins has been reviewed for example, by E. P. Abraham, Pharmacol. Rev. 14, 473–500 (1962), by I. M. Rollo, Ann. Rev. Pharmacol. 6, 218–221 (1966) by E. P. Abraham, Quart. Rev. (London) 21, 231 (1967), by E. Van. Heyningen. Advan. Drugs. Res., 4, 1–70 (1967), by G. T. Stewart, The Penicillin Group of Drugs. Elsevier Publishing Company, New York, N.Y. (1965) at pages 185–192 and briefly in Annual Reports in Medicinal Chemistry, Academic Press, Inc., 111 5th Ave., New York, N.Y. 10003 by L. C. Cheney on pages 96 and 97 (1967) and by K. Gerzon and R. B. Morin on pages 90–93 (1968) and by K. Gerzon on pages 78–80 (1969). New cephalosporins are frequently reported at the annual Interscience Conference on Antimicrobial Agents and Chemotherapy as illustrated by Sassiver et al., Antimicrobial Agents and Chemotherapy—1968, American Society for Microbiology, Bethesda, Md., pages 101–114 (1969) and by Nishida et al., ibid, 236–243 (1970).

7-phenylacetamidocephalosporanic acid has also been named N-phenylacetyl derivative of 7–ACA, cephaloram, PACA and apparently phenasporin. Publications in the scientific literature on the preparation and/or properties of this compound, with or without substituents in the benzene ring, and corresponding compounds in which the 3-acetoxymethyl group has been replaced by methyl, hydroxymethyl and/or pyridiniummethyl include the following:

Chauvette, R. R., et al. "Chemistry of Cephalosporin Antibiotics II. Preparation of a New Class of Antibiotics and the Relation of Structure To Activity," Journal of the American Chemical Society, 84, 3401–3402 (1962).

Chauvette, R. R., et al. "Structure-Activity of Relationships Among 7-Acylamidocephalosporanic Acids," Antimicrobial Agents and Chemotherapy—1962, 687–694.

Cocker, J. D. et al., "Cephalosporanic Acids. Part II. Displacement of the Acetoxy-Group by Nucleophiles," Journal of the Chemical Society, 5015–5031 (1965).

Cocker, J. D., et al., "Cephalosporanic Acids. Part IV. 7-Acylamidoceph-2-em-4-Carboxylic Acids," Journal of in the Chemical Society, 1142–1151 (1966).

Culp, H. W., et al., "Metabolism and Absorption of 7-(Phenylacetamido - 1 - $C^{14}$)-Cephalosporanic Acid," Antimicrobial Agents and Chemotherapy—1963, 243–246.

Jago, M., "Antibacterial Activity of Some Derivatives of 7-Aminocephalosporanic Acid Against *Staphylococcus aureus* and Snyergism Between These and Other Antibiotics," Brit. J. Pharmacol., 22, 22–33 (1964).

Loder, B., et. al., "The Cephalosporin C Nucleus (7-Aminocephalosporanic Acid) and Some of Its Derivatives," Biochemical Journal, 79, 408–416 (1961).

Nishida, M., et al., "Studies on Microbial Degradation of Cephalosporin C Derivatives II," The Journal of Antibiotics, 21, 375–378 (1968).

Nishida, M., et al., "Studies of Microbial Degradation of Cephalosporin C Derivatives I," The Journal of Antibiotics, 21, 165–169 (1968).

Spencer, J. L., et al., "Chemistry of Cephalosporin Antibiotics VIII. Synthesis and Structure-Activity Relationships of Cephaloridine Analogues," Antimicrobial Agents and Chemotherapy—1966, 573–580.

Stedman, R. J., et al., "7-Aminodesacetoxycephalosporanic Acid and Its Derivatives," J. Med. Chem., 7(1), 117–119 (1964).

Sullivan, H. R., et al., "Metabolism of Oral Cephalothin and Related Cephalosporins in the Rat," Biochemical Journal, 102, 976–982 (1967).

Vymola, F., et al., "The Classification and Characteristics of Cephalosporin Antibiotics I. Systematic Study of the Quantitative Sensitivity of Some Pathogenic Microorganisms to Cephaloridine," Journal of Hygiene, Epidemiology, Microbiology and Immunology, 10, 180–189 (1966).

Many other 7-acyl derivatives of 7-aminocephalosporanic acid have been reported in the patent literature including 7-[4-(α-aminoalkyl)phenylacetamido]cephalosporanic acids (U.S. Pat. 3,382,241), 7-[(p-aminophenylthio)acetamido]cephalosporanic acid (U.S. Pat. 3,422,-100), 7-halophenylthioacetamido)cephalosporanic acids (U.S. Pat. 3,335,136) and the nearly unlimited number of variations of such compounds encompassed by the generic formulae (and often not otherwise described) of such patents as Netherlands 69/02013 (Farmdoc 39,172). 7-(p-aminophenylacetamido)-cephalosporanic acid is disclosed in U.S. Pat. 3,422,103 as is the corresponding N-trityl derivative; see also Japan 2712/67 (Farmdoc 25,406).

U.S. Pat. 3,219,662 includes claims to compounds of the structure R—CH$_2$—CO—ACA in which R is phenyl, nitrophenyl (especially para-nitro), chlorophenyl, alkylphenyl and alkoxyphenyl and the corresponding phenoxy and substituted compounds and for all of those the corresponding compounds in which the 3-acetoxymethyl group has been replaced by a 3-pyridiniummethyl group. A more extensive group of such compounds, including the series in which R is phenylthio and also the compounds in which R is benzyl [i.e., 7-(β-phenylpropionamido)cephalosporanic acid], alkoxybenzyl, alkanoyloxybenzyl, aminobenzyl, etc. are disclosed, at least generically, for use as starting materials in Great Britain 1,012,943 and 1,153,421 (Farmdoc 23,984) and see also Great Britain 1,001,478 and U.S. 3,280,118. Additional 7-phenylacetamidocephalosporanic acids having substituents on the benzene ring including hydroxy and amino are disclosed as starting materials in Great Britain 1,082,943 and 1,082,962.

U.S. Pat. 3,341,531 describes the 7-(o-, m- and p-carboxamidomethylphenylacetamido)cephalosporanic acids and their betaines. A variety of 7-(halo-, dihalo, nitro- and halonitro-phenylacetamido)cephalosporanic acids are named as starting materials for reaction with certain nucleophiles in U.S. Pat. 3,431,259 (Farmdoc 27,715). Additional 7-(phenylacetamido)cephalosporanic acids having various substituents on the benzene ring are disclosed in Japan 2712/67 (Farmdoc 25,406), Japan 26105/69 (Farmdoc 40,860), Great Britain 1,178,471 (Farmdoc 27,715, see Netherlands 67/00906) and Japan 25,785/69 (Farmdoc 40,847).

Replacement of the 3-acetoxy group of a cephalosporin by various heterocyclic thiols has been disclosed (a) In South Africa 70/2290 [see also Netherlands 70/05519 (Farmdoc 80,188R)] where the sidechains were, for example, 7α-aminophenylacetamido and typical heterocyclic thiols were 2-methyl-1,3,4-thiadiazole-5-thiol and 1-methyl-1,2,3,4-tetrazole-5-thiol, and (b) In U.S. 3,516,997 where the sidechains at the 7-position had structures such as $R^3$—(alk)m—CO—NH and $R^3$—S—(alk)m—CO—NH— in which $R^3$ was one of many aromatic heterocycles and the numerous heterocyclic thiols at the 3-position included, for example, 1-methyl-tetrazole-5-thiol and 2-methyl-1,3,4-thiadiazol-5-thiol, and (c) In U.S. Pat. 3,563,983.

U.S. Pat. 3,492,297 (includes 7-(p-guanidinophenyl)-acetamido)cephalosporanic acid and its betaine.

In cephaloridine the 3-acetoxy group of cephalothin was replaced by a pyridinium group as described, for example, in U.S. Pats. 3,449,338 and 3,498,979.

The preparation of various 7-[α-amino-acrylacetamido-[cephalosporanic acids and the corresponding desaryloxy compounds in which aryl represents unsubstituted or substituted phenyl or 2- or 3-thienyl is described, for example, in British specifications 985,747, 1,017,624, 1,054,806 and 1,123,333, in Belgian Pat. 696,026 (Farmdoc No. 29,494), in U.S. Pats. 3,311,621, 3,352,858, 3,489,750, 3,489,751, 3,489,752 and 3,518,260, in Japanese Pat. 1687/66 (Farmdoc 23,231), by Spencer et al., J. Med. Chem., 9(5), 746–750 (1966) and by Kuritas et al., J. Antibiotics (Tokyo) (A) 19, 243–249 (1966) and see also U.S. Pat. 3,485,819.

Netherlands Pat. 68/11676 (Farmdoc 36,349) and 68/12382 (Farmdoc 36,496) and U.S. Pats. 3,489,750 and 3,489,751 and 3,489,752 disclose ring-substituted cephaloglycins.

Various 7 - [α - amino-arylacetamido]cephalosporins in which one hydrogen of the -amino group is replaced by a carbonyl group which is attached in turn to another moiety have been reported. The earliest were the cephaloglycin and cephalexin precursors in which use was made of a common peptide blocking group such as carbobenzyloxy as illustrated in U.S. Pat. 3,364,212. Belgian Pat. 675,298 (Farmdoc 22,206), South African Pat. 67/1260 (Farmdoc 28,654 and Bel. Pat. 696,026 (Farmdoc 29,494). Related compounds include those of U.S. Pat. 3,303,193 and 3,311,621 and 3,518,260.

Various cephalosporins, including cephalosporin C on occasion but not cephaloglycin, have been reacted with nucleophilic, aromatic mercaptans to produce compounds having the structure

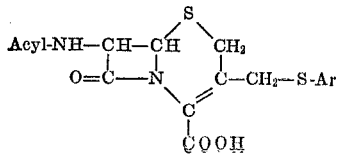

In U.S. Pat. 3,278,531 Ar is phenyl or certain substituted phenyls or certain aromatic heterocyclic rings named, for example, in column 5. Similar nucleophiles, e.g. 2-mercaptopyrimidines, are disclosed in U.S. 3,261,832 and Great Britain 1,101,422 and U.S. 3,479,350 and U.S. 3,502,665, all issued to Glaxo. A parallel disclosure is found in Great Britain 1,109,525 to Ciba, e.g. in definition h for $R_3$. Additional nucleophiles of this type were disclosed by Fujisawa in Belgian 714,518 (Farmdoc 35,307; Netherlands 68/06129 and South Africa 2695/68), in Canada 818,501 (Farmdoc 38,845), in Great Britain 1,187,323 (Farmdoc 31,936); U.S. 3,530,123, Netherlands 67/14888 and especially in U.S. 3,516,997 (Farmdoc 34,328; Netherlands 68/05179) which includes the compound named cefazolin, which has a tetrazolylacetyl sidechain on the 7-amino group and a 5-methyl-thiadiazolyl-thiomehyl group at the 3-position and is described at some length in the scientific literature, e.g. in Antimicrobial Agents and Chemotherapy—1969, American Society for Microbiology, Bethesda, Md. at pages 236–243 and in J. Antibiotics (Japan) 23(3), 131–148 (1970).

Various cephalosporins having the structure

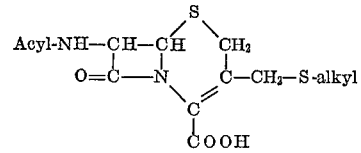

in which acyl represents various sidechains including α-aminophenylacetyl have been described in some of the above and by Glaxo in Belgium 734,532 (Farmdoc 41,619) and in Belgium 734,533 (Farmdoc 41,620)

Cephalosporins having the structure

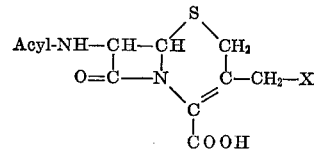

where X includes

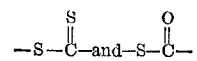

are disclosed in some of the above and in U.S. 3,239,515, 3,239,516, 3,243,435, 3,258,461, 3,431,259 and 3,446,803.

Related publications in the scientific literature include J. Med. Chem. 8, 174–181 (1965) and J. Chem. Soc. (London) 1595–1605 (1965), 5015–5031 (1965) and 1959–1963 (1967).

SUMMARY OF THE INVENTION

This invention comprises the amphoteric compound of the formula

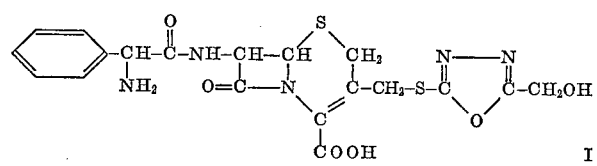

having the D configuration and existing primarily as the zwitterion, and its nontoxic pharmaceutically acceptable salts.

Such salts include the nontoxic carboxylic acid salts thereof, including nontoxic metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1 - ephenamine, N,N'-dibenzylethylenediamine, dehydroabietylamine, N,N'-bis-dehydroabietylethylenediamine, N-(lower)-alkylpiperidine, e.g., N-ethylpiperidine, and other amines which have been used to form salts with benzylpenicillin; and the nontoxic acid addition salts thereof (i.e., the amine salts) including the mineral acid addition salts such as the hydrochloride, hydrobromide, hydroiodide, sulfate, sulfamate and phosphate and the organic acid addition salts such as the maleate, acetate, citrate, oxalate, succinate, benzoate, tartrate, fumarate, malate, mandelate, ascorbate and the like.

The amphoteric compound of the present invention is prepared according to the present invention by coupling with 7-amino-3-(5-[hydroxymethyl]-1,3,4-oxadiazol-2-yl-thiomethyl)-3-cephem-4-carboxylic acid (II) (or a salt or easily hydrolyzed ester thereof including those of U.S. Pat. 3,284,451 and any of the silyl esters described in U.S. Pat. 3,249,622 for use with 7-aminopenicillanic acid and used in Great Britain 1,073,530) a particular acid or its functional equivalent as an acylating agent for a primary amino group. After coupling, the blocking group is removed to give the desired product. Said acid has the formula

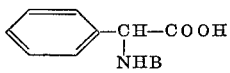

wherein B represents a blocking group of the type used either in peptide syntheses or in any of the numerous synthesis of α-aminobenzylpenicillin from 2-phenylglycine. Particularly valuable blocking groups are a proton, as in the compound of the formula

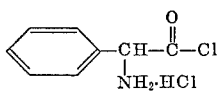

or a β-diketone as in Great Britain 1,123,333, e.g., methyl acetoacetate, in which case the acid containing the blocked amino group is preferably converted to a mixed anhydride, as with ethyl chloroformate, before reaction with compound II or a salt thereof to form the desired product I after acid cleavage.

Further to the discussion above of blocking groups used on the free amino group of the sidechain acid during its coupling with compound II, the blocking group is then removed to form the products of the present invention, e.g., the t-butoxy-carbonyl group is removed by treatment with formic acid, the carbobenzyloxy group is removed by catalytic hydrogenation, the 2 - hydroxy-1-naphthcarbonyl group is removed by acid hydrolysis and the trichloroethoxycarbonyl group by treatment with zinc dust in glacial acetic acid. Obviously other functionally equivalent blocking groups for an amino group can be used and such groups are considered within the scope of this invention.

Thus, with respect to said acid to be used to couple with compound II, functional equivalents include the corresponding acid anhydrides, including mixed anhydrides and particularly the mixed anhydrides prepared from stronger acids such as the lower aliphatic monoesters of carbonic acid, or alkyl and aryl sulfonic acids and of more hindered acids such as diphenylacetic acid. In addition, an acid azide or an active ester or thioester (e.g., with p-nitrophenol, 2,4-dinitrophenol, thiophenol, thioacetic acid) may be used or the free acid itself may be coupled with compound II after first reacting said free acid with N,N'-dimethylchloroformiminium chloride [cf. Great Britain 1,008,170 and Novak and Weichet, Experientia XXI, 6 360, (1965)] or by the use of enzymes or of an N,N'-carbonyldiimidazole or an N,N'-carbonyl-ditriazole [cf. South African patent specification 63/2684] or a carbodiimide reagent [especially N,N'-dicyclohexylcarbodiimide, N,N'-diisopropylcarbodiimide or N-cyclohexyl-N' - (2-morpholinoethyl)carbodiimide; cf. Sheehan and Hess, J. Amer. Chem. Soc., 77, 1067 (1955)], or of alkylylamine reagent [cf. R. Buijle and H. G. Viehe, Angew. Chem. International Edition 3, 582 (1964)], or of a ketenimine reagent [cf. C. L. Stevens and M. E. Mond, J. Amer. Chem. Soc., 80, (4065)] or of an isoxazolium salt reagent [cf. R. B. Woodwar, R. A. Olofson and H. Mayer, J. Amer. Chem. Soc., 83, 1010 (1961)]. Another equivalent of the acid chloride is a corresponding azolide, i.e., an amide of the corresponding acid whose amide ntirogen is a member of an quasiaromatic five membered ring containing at least two nitrogen atoms, i.e., imidazole, pyrazole, the triazoles, benzimidazoles, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield dimidazolide. The by-product, imidazole, precipitates and may be separated and the imidazolide isolated, but this is not essential. The methods for carrying out these reactions to produce a cephalosporin and the methods used to isolate the cephalosporin so produced are well known in the art.

In the treatment of bacterial infections in man, the compounds of this invention are administered orally or parenterally, in accordance with conventional procedures for antibiotic administration, in an amount of from about 5 to 200 mg./kg./day and preferably about 5 to 20 mg./kg./day in divided dosage, e.g., three to four times a day. They are administered in dosage units containing, for example, 125 or 250 or 500 mg. of active ingredient with suitable physiologically acceptable carriers or excipients. The dosage units are in the form of liquid preparations such as solutions or suspensions or as solids in tablets or capsules.

Exactly 200 g. of 7-aminocephalosporanic acid (7-ACA) was suspended in 500 ml. of acetone and a solution of 240 g. of p-toluenesulfonic acid in 500 ml. of acetone was added in one charge. After stirring for five minutes, at room temperature, the mixture was filtered through diatomaceous earth ("Super Cel") and the bed washed with 150 ml. of acetone (the insoluble matter weighed about 30 g.). Then 80 ml. of water was added to the filtrate and, while stirring, the p-toluene-sulfonate salt crystallized out after scratching on the inside of the flask with a glass rod. The suspension was stirred in an ice-salt bath for thirty minutes and filtered cold. It was washed with 2× 200 ml. of cold acetone (0° C.) and air dried; yield 250 g. of salt. This p-toluenesulfonate salt of 7-ACA was stirred in 2 liters of methanol and the insoluble matter filtered through "Super Cel." The filtrate was placed in a five liter 3 neck flask and 2 liters of water were added. Then the pH was adjusted to 4 by the addition of concentrated ammonium hydroxide with cooling and the suspension stirred for one hour at 0° C. The product was collected by filtration and washed with 2× 100 ml. $H_2O$ (0° C.) and 3× 1 liter acetone (room temperature). After air drying, the yield of 7–ACA was 145 g.

Reference: Glaxo, British Pat. 1,104,938 (1968).

The following examples are given in illustration of, but not in limitation of, the present invention. All temperatures are in degrees centigrade. 7-aminocephalosporanic acid is abbreviated as 7-ACA and methyl isobutyl ketone as MIBK. "Skellysolve B" is a petroleum ether fraction of B.P. 60–68° C. consisting essentially of n-hexane.

DESCRIPTION OF THE PREFERRED EMBODIMENTS

Example 1

Sodium D-α-[1-carbomethoxypropen - 2 - yl-amino]-phenylacetate.—Lit. ref. E. Dane, F. Oreis, P. Konrad, T. Dockner, Angew. Chem. Intern. Ed. Engl. 1, 658 (1962); E. Dane and T. Dockner Angew. Chem. 76, 342 (1964); Spencer, Flynn, Roeske, Sin and Chauvette, J. Med. Chem., 9, 746–50 (1966); U.S. Pat. 3,496,171 (Lilly).

To a well stirred mixture of 40 g. (1 mole) of NaOH in 40 ml. of H$_2$O and one liter of benzene was added 151.6 g. (1 mole) of D-(—)-phenylglycine. The mixture was held at about 55° C. for 30 minutes and then with vigorous stirring 116 g. (1 mole) of methyl acetoacetate was added and the mixture stirred and heated at reflux until no more water was collected in the Dean Stark trap. Next one liter of acetone was added with the heat removed and then the slurry was cooled and stirred 30 minutes in an ice-salt bath. The product was collected by filtration, washed well with copious amounts of acetone and air dried. Yield was 191 g., dec. pt. 252° C.

$[\alpha]_D^{22° C.}+207°$ (C.=1%, H$_2$O).

Hydroxyacethydrazide. Ethyl glycolate (10.41 g., 0.10 mole) was dissolved in 15 ml. of absolute ethanol and treated dropwise with 7.5 ml. (0.10 mole) of 85% hydrazine hydrate. The mixture was heated at reflux for 1 hour and then cooled. Evaporation under reduced pressure gave a liquid residue which solidified on treatment with a small volume of ethanol. This material (7.2 g., M.P. 87–92° C.) was crystallized ffrom ethanol giving 6.6 g. (73%) of hydroxyacethydrate with M.P. 90–93° C.

2-mercapto - 5 - (hydroxymethyl)-1,3,4-oxadiazole potassium salt.—Hydroxyacethydrazide (18.0 g., 0.20 mole) and potassium hydroxide (11.2 g., 0.20 mole) were treated with 400 ml. of absolute ethanol containing 30 ml. of dimethylsulfoxide. This solution was then stirred and treated with 60 ml. of carbon disulfide resulting in the formation of a yellow crystalline solid. The stirred mixture was heated at reflux and after 36 hours evolution of hydrogen sulfide had ceased.

Cooling and filtration gave 21.6 g. of crystalline product with M.P. 178–80° C. Evaporation of the filtrate and crystallization of the residue from ethanol gave a further 2.91 g. (72%).

Further crystallizations raised the M.P. to 179.5–181° C.

Calculated for C$_3$H$_3$KN$_2$O$_2$S (percent): C, 21.17; H, 1.78; N, 16.46.

Found (percent): C, 21.28; H, 1.77; N, 16.58.

7-amino - 3 - [S-(5-hydroxymethyl-1,3,4-oxadiazole-2-yl)-thiomethyl]-3-cephem - 4 - carboxylic acid.—A mixture of 17.0 g. (0.1 mole) of 2-mercapto-5-hydroxymethyl-1,3,4-oxadiazole potassium salt, 27.2 g. (0.1 mole) of 7-ACA, 8.4 g. (0.1 mole) of NaHCO$_3$ in 500 ml. of 0.1 M phosphate buffer, pH 6.4, was heated at 55° C. for five hours. The resulting solution was cooled to 20° C. and acidified to pH 5.5 with 40% H$_3$PO$_4$. After stirring 15 min. the precipitate was collected by filtration, washed with 50 ml. of cold water and then 200 ml. of acetone and air dried. After vacuum drying over P$_2$O$_5$ there was obtained 13.5 g. of 7-amino-3-[S-(5-hydroxymethyl-1,3,4-oxadiazole - 2 - yl)-thiomethyl]-3-cephem - 4 - carboxylic acid, dec. pt. >100° C. (indefinite). The IR and NMR spectra were entirely consistant with the desired structure.

Analysis.—Calcd. for C$_{11}$H$_{12}$N$_4$O$_5$S$_2$ (percent): C, 38.37; H, 3.52; N, 16.28. Found (percent): C, 36.93; H, 3.78; N, 16.48.

7-[D-α-amino - α - phenylacetamido] - 3 - [S-(5-hydroxymethyl - 1,3,4 - oxadiazole - 2 - yl)-thiomethyl]-3-cephem-4-carboxylic acid.—To a stirred suspension of 8.13 g. (0.03 mole) of sodium D-α-[1-carbomethoxypropen-2-yl)amino]-phenyl acetate in 100 ml. of acetonitrile and 0.1 ml. of N,N-dimethylbenzylamine, cooled to —10° C., was added 3.53 g. (0.033 mole) of ethyl chloroformate. After 20 min. at —10° C. a solution of 10.33 g. (0.03 mole) of 7-amino-3-[S-(5-hydroxymethyl-1,3,4-oxadiazole-2-yl)-thiomethyl]-3-cephem - 4 - carboxylic acid, 50 ml. water, 50 ml. of acetonitrile and 4.2 ml. (0.03 mole) of triethylamine, precooled to 0° C. was added all at once with vigorous stirring. The temperature was kept at 0° C. for 45 min. and then salt (NaCl) was added in excess to saturate the solution. This took 15 min. The organic (top) layer was separated and 40 ml. of water was added to it. The resulting solution was then concentrated at reduced pressure at 20° C. to a volume of about 50 ml. To this aqueous solution was added a solution of 100 ml. of methyl isobutyl ketone (MIBK) and 15 ml. of 90% formic acid and the mixture shaken for a few seconds and then stirred at 0° C. for three hours. The aqueous phase was then separated and the pH adjusted to 3.3 with solid NaHCO$_3$. Fresh MIBK (100 ml.) was added and the mixture cooled and stirred at 0° C. for 1 hr. The gum which separated was stirred with 60 ml. of 10% H$_3$PO$_4$ for 15 min. and filtered. The filtrate was stirred 10 min. with 1 g. of "Darko KB" decolorizing carbon, filtered again and the pH adjusted to 3.4 with solid NaHCO$_3$. The resulting slurry was cooled at 0° C. for 30 min. and the product, 7-[D-α-amino-α-phenylacetamido]-3-[S-(5 - hydroxymethyl - 1,3,4 - oxadiazole-2-yl]-thiomethyl]-3-cephem-4-carboxylic acid was collected by filtration, washed with 2 ml. of ice cold water and air dried. Yield 210 mg. dec. at 210° C. A second crop, obtained by concentrating the filtrate, weighed 300 mg. This second crop had an IR and NMR spectra entirely consistant with the desired structure, but contained about 25% salts as a contaminate.

7 - [D - (α - amino - α - phenylacetamido) ]-3-[S-(5-hydroxymethyl - 1,3,4 - oxadiazol - 2 - yl)thiomethyl]-3-cephem-4-carboxylic acid (called New Compound) after solution in 5% NaHCO$_3$ (for Lot 01) or dimethylsulfoxide (for Lot 02) followed by dilution with Nutrient Broth was found to exhibit the following Minimum Inhibitory Concentrations (M.I.C.) in mcg./ml. versus the indicated microorganisms as determined by overnight incubation at 37° C. by Tube Dilution. Results with four old compounds are also given.

TABLE 1

[MIC in mcg./ml.]

| Organism | | New compound | | Cepha-lexin | Cephalo-glycin | Cepha-lothin | Cephalo-ridine |
|---|---|---|---|---|---|---|---|
| | | Lot 1 | Lot 2 | | | | |
| D. pneumoniae* | A9585 | .08 | .02 | .16 | .04 | .01 | .004 |
| Str. pyogenes plus 5% serum* | A9604 | .08 | .04 | .3 | .04 | .08 | .008 |
| S. aureus Smith | A9537 | 2.5 | 2.5 | 1.3 | .6 | .16 | .03 |
| S. aureus Smith plus 50% serum | A9537 | >1.3 | >1.3 | 2.5 | 1.3 | .3 | .03 |
| S. aureus BX1633-2 at 10$^{-3}$ dilution | A9606 | 2.5 | 2.5 | 10 | 1.3 | .3 | .16 |
| S. aureus BX1633-2 at 10$^{-2}$ dilution | A9606 | 8 | 4 | 8 | 1.3 | .6 | 4 |
| S. aureus meth.-resistant | A15097 | 63 | 16 | 63 | 8 | >2.5 | 5 |
| Sal. enteritidis | A9531 | 2 | .5 | 4 | .3 | .3 | .6 |
| E. coli Juhl | A15119 | 8 | 2 | 8 | .5 | 16 | 2 |
| E. coli | A9675 | 32 | 8 | 32 | 2 | 63 | 8 |
| K. pneumoniae | A9977 | 4 | 1 | 4 | .3 | 2 | 1 |
| K. pneumoniae | A15130 | 32 | 8 | 16 | 1 | 16 | 4 |
| Pr. mirabilis | A9900 | 8 | 2 | 4 | .6 | 1 | 1 |
| Pr. morganii | A15153 | 125 | 63 | >125 | 63 | >125 | >125 |
| P. aeruginosa | Q9843A | >125 | >125 | >125 | >125 | >125 | >125 |
| Ser. marcescens | A20019 | >125 | >125 | >125 | >125 | >125 | >125 |

*50% nutrient broth, 45% antibiotic assay broth.

Blood levels in the mouse after oral administration were determined with the following results:

| R= | Dose, mgm./kg. | Blood level in mcg./ml., hours after administration of dose— | | | |
|---|---|---|---|---|---|
| | | 0.5 hr. | 1 hr. | 2 hrs. | 3.5 hrs. |
| −S−C(=N−N=)C−CH₂OH (with O bridge) | 100 | 7.4 | 5.9 | 2.2 | 0.8 |
| H (cephalexin monohydrate) | 100 | 45 | 24.9 | 7.5 | 3.5 |
| −O−C(=O)−CH₃ (cephaloglycin dihydrate) | 100 | 1.64 | 2.4 | 1.6 | 0.8 |

(structure at top of table: phenyl-CH(NH₂)-CONH-[β-lactam-cephem]-CH₂R, COOH)

Example 2

Sodium 7-[D-(α-amino-α-phenylacetamido]-3-[S-(5-hydroxymethyl-1,3,4-oxadiazol-2-yl)thiomethyl]-3-cephem-4-carboxylate.—To a stirred aqueous susenpsion of the zwitterionic form of 7-[D-(α-amino-α-phenylacetamido)]-3-[S-(5-hydroxymethyl-1,3,4-thiadiazol-2-yl)thiomethyl]-3-cephem-4-carboxylic acid (0.8 mmole) is added 1 N aqueous sodium hydroxide at room temperature until a clear solution (pH 10.8) is obtained. This solution is immediately freeze-dried to give impure, solid sodium 7-[D-(α-amino-α-phenylacetamido)]-3-[S-(5-hydroxymethyl-1,3,4-thiadiazol-2-yl)thiomethyl]-3-cephem-4-carboxylate.

Example 3

A suspension of the zwitterionic form of 7-[D-α-amino-α-phenylacetamido]-3-[S-(5-hydroxymethyl-1,3,4-oxadiazole-2-yl)-thiomethyl]-3-cephem-4-carboxylic acid (0.361 g.) in 3 ml. of methanol is cooled in ice and treated with a few drops of concentrated hydrochloric acid until a clear solution is obtained. 7-[D-α-amino-α-phenylacetamido]-3-[S-(5-hydroxymethyl]-1,3,4-oxadiazole-2-yl)-thiomethyl]-3-cephem-4-carboxylic acid hydrochloride precipitates as a pale brown colored solid upon the addition of ether and is collected by filtration and dried in vacuo over $P_2O_5$.

I claim:

1. The compound having the D configuration in the sidechain of the formula

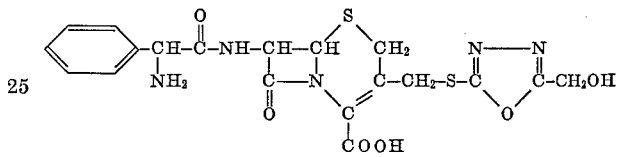

or a nontoxic, pharmaceutically acceptable salt thereof.

2. The compound having the D configuration in the sidechain of the formula

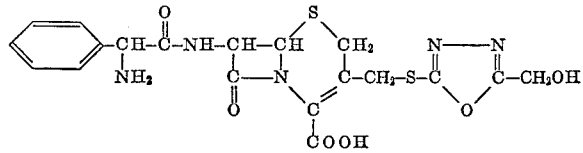

3. The sodium salt of the compound of claim 2.
4. The potassium salt of the compound of claim 2.
5. The hydrochloride of the compound of claim 2.
6. The zwitterion form of the compound of claim 2.
7. A nontoxic, pharmaceutically acceptable acid addition salt of the compound of claim 2.

References Cited

UNITED STATES PATENTS 3,641,021   2/1972   Ryan _____ 260—243 C

NICHOLAS S. RIZZO, Primary Examiner

U.S. Cl. X.R.

424—246